C. Whipple,
Reciprocating Saw-Mill,
N° 16,416. Patented Jan. 13, 1857.
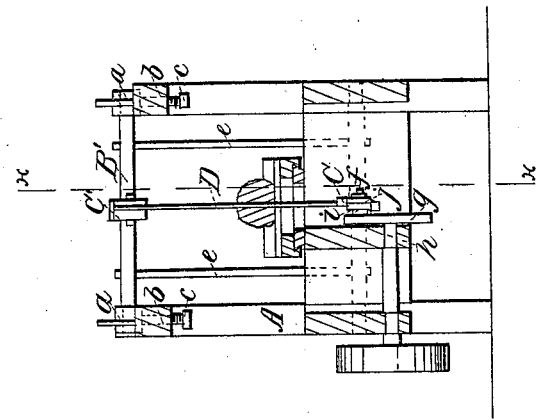
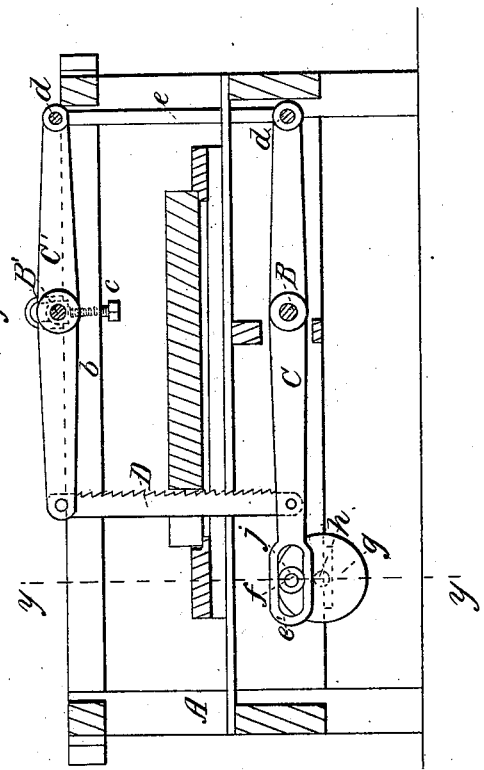

UNITED STATES PATENT OFFICE.

CARLYLE WHIPPLE, OF LEWISTON, MAINE.

METHOD OF HANGING AND OPERATING RECIPROCATING SAWS.

Specification of Letters Patent No. 16,416, dated January 13, 1857.

*To all whom it may concern:*

Be it known that I, CARLYLE WHIPPLE, of Lewiston, in the county of Androscoggin and State of Maine, have invented a new and Improved Mode of Hanging and Driving Reciprocating Saws; and I do hereby declare that the following is a full, clear, and exact description of the same, reference being had to the annexed drawings, making a part of this specification, in which—

Figure 1 is a longitudinal vertical section of my inmprovement (*x*) (*x*), Fig. 2, showing the plane of section. Fig. 2 is a transverse vertical section of ditto, (*y*) (*y*), Fig. 1 showing the plane of section.

Similar letters of reference indicate corresponding parts in the two figures.

To enable those skilled in the art to fully understand and construct my invention I will proceed to describe it.

A represents a rectangular framing in which the shafts B, B′, are placed transversely. The lower shaft B is fitted in permanent bearings, but the bearings (*a*) of the upper shaft B′, are fitted in mortises in the upper side pieces (*b*) (*b*) of the framing and have set screws (*c*) placed below them, one underneath each bearing. The set screws are placed vertically in the side pieces (*b*) (*b*) and by turning them the bearings (*a*) may be elevated when necessary.

On the upper shaft B′, a lever C′, is placed, the shaft B′ passing through the center of said lever. This lever is permanently attached to the shaft B′. A similar lever C is attached to the lower shaft B. One end of the two levers C, C′, have each a rod (*d*) passing through them. These rods are fitted permanently in the levers and the ends of the two rods (*d*) (*d*) are connected by rods (*e*) which are fitted loosely on the ends of the rods (*d*) (*d*). To the opposite ends of the lever C, C′, the saw D is attached. The end of the lower lever C where the lower end of the saw D is attached is extended rather farther outward than the upper lever and an oblong slot (*e′*) is made in it, said slot receiving a crank pin (*f*) on a pulley (*g*). The pulley (*g*) is placed on the inner end of a driving shaft (*h*) which is fitted in the lower part of the framing A. The crank pin (*f*) has two friction rollers (*i*) (*j*) upon it, the rollers being placed side by side, and placed loosely upon the crank pin (*f*). The upper and lower ends of the lever C at the edges of the slot (*e′*) are bent slightly out of line with each other, so that as the crank pin (*f*) describes its circle of rotation one roller will bear against the upper side of the slot (*e′*) and the other against the lower side. By this means a reciprocating motion is given the saw D, with but little friction as the levers C, C′, are balanced upon their shafts B, B′. The saw is strained in a perfect manner by elevating the bearings (*a*) of the upper shaft B′. This is effected by turning the screws (*b*) (*b*) as previously stated.

The two levers C, C′, work parallel with each other. The end of the upper lever C when the saw is attached does not rise above its shaft B, consequently the saw D will recede from its work as it moves upward and will approach its work as it moves downward. When large saws are arranged in this way, a carriage operated by any proper feed motion may be used, but for small scroll or jig saws may work through a table or platform, movable or stationary, on which the stuff to be sawed is placed and turned and fed to the saw by hand.

By the above improvement the saw may be readily and perfectly strained, and driven with but comparatively a small amount of power. The friction of a sash or frame is avoided. There are no parts liable to get out of repair and several levers may be attached to the same shafts so that a gang of saws may be driven from the same driving shaft, and saws may, if desired, be attached to each end of the levers.

I do not claim the two levers C, C′, to which the saw D is attached, separately, for they have been previously used; but

Having thus described my invention, what I do claim as new and desire to secure by Letters Patent, is—

The levers C, C′, two or more, when the upper lever or levers are attached to an adjustable shaft B′ and the levers driven by a crank pin (*f*) having the rollers (*i*) (*j*), fitted upon it and working within a slot (*e*) in the lower lever C, the saw D being attached to the end of the levers and the whole arranged as herein shown and described for the purpose specified.

CARLYLE WHIPPLE.

Witnesses:
 NAHUM MORRILL,
 ENSIGN OTIS.